3,300,549
METHODS OF PRODUCING PROPELLANT GRAIN ADAPTED FOR SINGLE STAGE ROCKETS
Hideo Matsubara, 1213 2-chome, Kamishakujii, Tokyo, Japan
Original application Sept. 28, 1964, Ser. No. 399,634. Divided and this application June 22, 1966, Ser. No. 559,529
Claims priority, application Japan, Oct. 1, 1963, 38/53,089; Apr. 13, 1964, 39/20,689
10 Claims. (Cl. 264—3)

This application is a divisional application of Ser. No. 399,634 filed September 28, 1964.

This invention relates to methods of manufacture of propellant grain suitable for single stage rocket vehicles adapted specifically for being launched from the ground to high altitude.

As well known, the simplest form of grains of castable composite propellants in use today, such as of polysulfide/ammonium perchlorate and polybutadiene-ammonium perchloride, is an end-burning cylinder. Except for one end, a cylindrical grain is covered by a restrictor, and combustion proceeds from one end toward the other while forming a flat cross sectional burning area.

However, a highly efficient vehicle needs a slender configuration in order to lessen atmospheric drag, and accordingly a slender propellant grain. Hence, the grain is restricted to a very small burning area and a very great length. Thus, within the range of burning rates of propellants normally available, the thrust-to-weight ratio is too low, while the duration of burning is too long to launch a vehicle from the ground against gravity. If it is launched with assistance, for example with a catapult, a vehicle, such as a sounding rocket which is not guided by special control equipment, would follow a flight path curved downward under the influence of gravity with lapse of time, and, no matter how long the propellant was burnt, the propellant would be merely wasted, as the thrust vector would not be effectively in the upward direction. It is for this reason that end-burning grains of ordinary propellants are not adapted, and in fact generally not usable, for high altitude vehicles.

Therefore, in order to obtain propellant grains having greater thrusts and shorter durations of burning, numerous forms of grains have been developed. The most typical is that called the internal-burning grain. This type of grain has a perforation in the center running parallel to the longitudinal axis and is covered with a restrictor. Combustion starts on the inner surface of the perforation and proceeds in the circumferential direction. This means that, in a slender cylindrical grain used in a highly efficient vehicle, the burning area is very large and the web is very thin, so that, within the range of burning rates normally available, the thrust-to-weight ratio is very large and the duration of burning is very short. A vehicle incorporating an internal-burning grain, therefore, gains high acceleration in a limited period of time, and, when launched from the ground, it achieves maximum speed in the atmosphere at low altitude where atmosphere density is high, thus using up most of the energy for flight in the face of atmospheric drag before the vehicle can arrive at a high altitude. For this reason, the internal-burning grains of ordinary propellants are not actually suitable for high altitude vehicles. The grains of the above type are nevertheless widely in use, simply because no better alternative has yet been proposed. The loss of energy due to atmospheric drag is sometimes averted by launching the vehicle from a balloon. This launching method, however, has a major disadvantage in the complexity of apparatus to be used.

In general, the thrust and duration of burning for attaining a maximum altitude have optimum values determined only by analytical study with respect to individual vehicles. The values are predicated on the properties of end-burning grains and internal-burning grains of conventional propellants.

It will be readily understood, therefore, that, if a burning area representing the values just between those of the two types above referred to is constantly made available, a conventional propellant can yield a grain which is capable of achieving an optimum duration of burning.

An object of the invention is to provide a method for forming a grain of new type which is capable of having desired values of thrust and burning duration in a steady state, between those of end-burning grain and internal-burning grain of the same configurations.

Another object of the invention is to provide a method for producing a grain composed of a composite propellant grain which is a mixture of a commercially available organic chemical fuel and inorganic oxidant, and a high-burning-rate explosive, such as commercially available black powder, for attaining said intermediate thrust and burning duration in a safe and positive manner.

Another object of the invention to provide a method for producing a grain adapted for use in launching high altitude single stage rocket vehicles.

For accomplishing these objects, the present invention is characterized by an arrangement, whereby a composite propellant grain of a mixture consisting of an organic chemical fuel and an inorganic oxidant is provided with a multiplicity of high-burning-rate explosive sticks of relatively small volumes at suitable intervals in the direction of burning, said high-burning-rate explosive being an explosive, such as black powder which is different in chemical composition from said propellant and has good ignitability, very high burning rate, and good burning property, and although the specific impulse may be small, said grain burns after ignition at one end to a steady burning condition, where burning proceeds with continuous formation of a hollowed burning surface.

According to a method of producing the propellant grain of the invention an axial hole is formed in a succession of propellant masses and an explosive stick of relatively high-burning-rate is inserted into each hole. The propellant masses are bonded together to form a cylindrical grain in which the sticks are arranged axially in at least one row in spaced relation with one another and the cylindrical grain is then placed upright in the center of a cylindrical vessel-like restrictor. The space between the cylindrical grain and the restrictor is then filled with liquid propellant suspension which solidifies to provide an integral bond.

Now, the invention will be described in further details with reference to several embodiments thereof illustrated in the appended drawings, in which.

Figure 1:
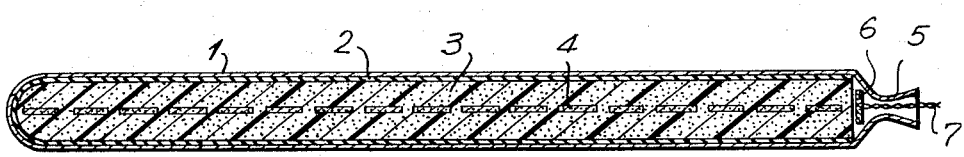
FIG. 1 shows a longitudinal section of a propellant grain embodying the invention.

Referring to FIG. 1 which is, precisely, a longitudinal section of a rocket motor incorporating a propellant grain which contains a multiplicity of high-burning-rate explosive sticks arranged in a row at suitable intervals along the longitudinal axis. In the figure, the numeral 1 indicates a combustion chamber, 2 a restrictor, and 3 a conventional propellant having a burning rate, for instance, of 10–20 mm./sec. The propellant is composed of an organic compound fuel and an inorganic compound oxidant, or a composite propellant composed, for example, of polysulfide and ammonium perchlorate or of polybutadiene and ammonium perchlorate. The numeral 4 designates sticks of high-burning-rate explosive of a chemical composition different from the above propellant, which has good ignitability, very high burning rate, for instance, of about 1000–2000 mm./sec., and good burning property, though the specific impulse may be low. Such sticks may, for example, be black powder prepared by compressing and molding a mixture composed of charcoal, sulfur, and saltpeter. Thus, the very high burning rate, 1000–2000 mm./sec. of the explosive stick 4 differs clearly from the burning rate, 10–20 mm./sec. of the propellant 3, and the former is about 100 times as high as the latter. Since each of these high-burning-rate explosive sticks are burnt out instantly, a stick with too large volume invites an undesirable sudden increase in the combustion pressure. It is therefore advisable that the high-burning-rate explosive stick be no more than one fiftieth of the total cross sectional area of the grain. The numeral 5 indicates a nozzle, 6 an igniter, and 7 an electrical conductor.

There next follows a description of the burning conditions of this propellant grain.

Figure 2:
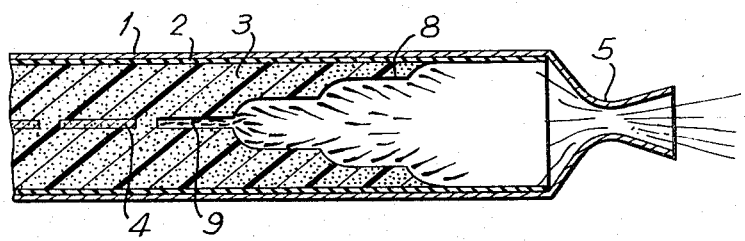
FIG. 2 is an enlarged side view of the grain of FIG. 1, in a burning state.

First, the igniter 6 is activated by an igniting signal given through the conductor 7, and ignites the open end of the grain. The initial burning surface is flat. As the grain continues burning for a while, the burning surface approaches one of the high-burning-rate explosive sticks 4 which is closest to the nozzle end. Thereupon, the flame inside the motor immediately contacts the stick, which in turn ignites and burns out instantly, leaving behind a small hollow having an opening at one end. The inner surface of the propellant 3 bounding the hollow is then ignited by the heat generated by the burning of said high-burning-rate explosive stick. As the combustion proceeds, the hollow increases in diameter and also in depth, with a resultant expansion in the burning area. The burning surface which advances inwardly from the bottom of the hollow soon reaches the next explosive stick, and by its explosion, another small hollow is formed, thereby extending the burning surface further inward. Thus, the burning along the center axis of the grain advances with intermittent jumps from stick to stick, with the result that the average burning rate along the center axis is very high as an average effect of the rapid burning rate of the explosive sticks and the usual rate between two adjacent sticks. The marginal portion burns in the outward direction with the increase in the diameter of the hollow mainly due to the progress of burning. Therefore, as the propellant grain achieves a steady state, the burning surface moves inward with an increase or decrease of the surface area while forming a U-shaped hollow, or more specifically, a combination of a cylindrical surface and an approximate partial spherical surface as represented by the burning surface 8 in FIG. 2. It will be readily understood that this burning area is larger than that of an end-burning grain of a similar configuration having a flat burning surface, but smaller than that of an internal-burning grain of a similar configuration having a perforation running parallel to the longitudinal axis. FIG. 2 illustrates a grain at the moment when an explosive stick therein has burnt out, thus leaving a small hollow 9 behind, whose inner surface in turn provides an additional burning area.

Figure 3:
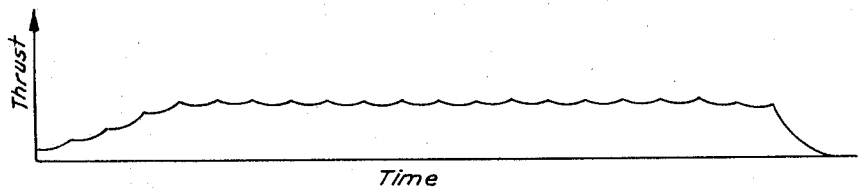
FIG. 3 shows the relation between the thrust and burning duration of the grain of FIG. 1.

In the propellant grain of the invention, as described above, the burning area is increased in a step-like manner from a low value until a steady burning state is achieved, and then it is increased and decreased alternatively. It follows therefore that the thrust is represented by a curve with respect to time as shown in FIG. 3.

Now, discussion will be made qualitatively of the effects of the thrust-time relation of the grain upon the flight performance of vehicles. The thrust exerted by this grain differs slightly from ordinary grains in two points. First, it takes some time-lag for the grain to achieve a steady thrust from the initial low thrust, and second, its thrust fluctuates in the steady state. The low initial thrust is evidently a disadvantage for a vehicle to be launched at rest. While this can be overcome by the use of a catapult, the launching device must be inevitably complicated. To avert this, the propellant of the invention has only to be adapted for use in a rocket of dual thrust type as described later, which will have an increased initial burning area and an enhanced initial thrust. Variations of the steady thrust offer no difficulty whatsoever, because the attainable altitude is governed substantially by the average value of thrust, as far as a vehicle such as an ordinary sounding rocket is concerned. Further, it is possible to some extent technically to minimize the thrust variations by using small explosive sticks at the smallest intervals possible.

Figure 4:
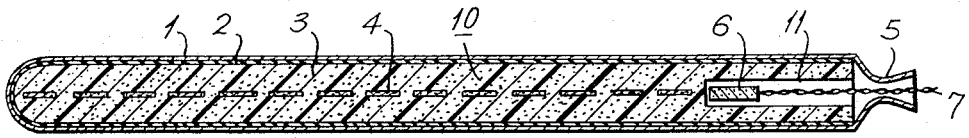
FIG. 4 shows a longitudinal section of another embodiment of the invention having a hollow opening at the nozzle end.
Figure 5:
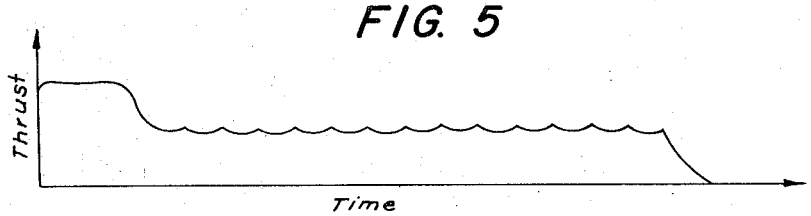
FIG. 5 shows the relation between the thrust and burning duration of the propellant grain of FIG. 4.

The foregoing discussion naturally leads to a conclusion that the only matter which must be taken into account in incorporating the grain of the invention in a single stage rocket vehicle to be launched from the ground as above described is the low initial thrust. A most adequate solution to this problem is to compensate for the deficiency of the initial burning area of the propellant grain 10 of the invention, as shown in FIG. 4, with an additional area capable of initially burning which is provided by a hollow 11 which is open at the ignition end, said hollow 11 being preferably of a star-type as in ordinary internal-burning grains. Since the propellant in the vicinity of the hollow 11 is burnt out in a relatively short period of time after the igniter 6 has been fired, only the thrust of the propellant grain 10 of the invention is effected in the latter half stage of burning of the grain. The thrust-time relation in this case is as shown in FIG. 5. Although a dual thrust curve is given in the figure, it is also possible in special cases to design grains which give an initial thrust equivalent to the average steady thrust.

The propellant grain according to the invention can attain a thrust which varies with time through an arrangement therein of high-burning-rate explosive sticks of partially different shapes and dimensions at varied intervals.

Figure 6:
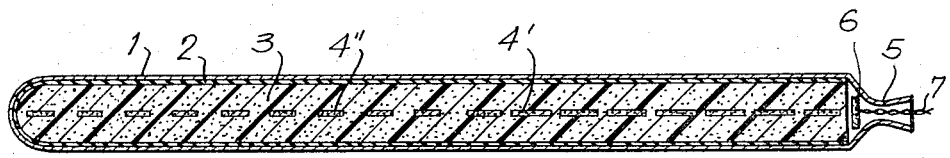
FIGS. 6 and 7 show longitudinal sections of other embodiments.

FIG. 6 is a longitudinal sectional view of another embodiment which gives a high thrust during the early half period of burning and a low thrust-time relation in the latter half period. In this embodiment, the explosive sticks 4' in the region closer to the nozzle are longer and arranged at shorter intervals than the sticks 4" in the forward region. This embodiment is given merely by way of illustration, and the dimension, shapes, and intervals can be selected freely to meet the specific design purposes. Here lies an outstanding feature of the grain of the invention; any desired thrust-time relation can be achieved over a broad range.

Figure 7:
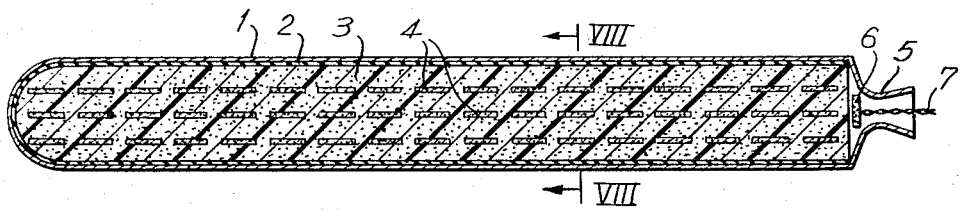
Figure 8:
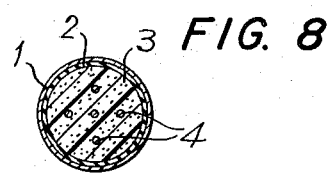
FIG. 8 is a cross sectional view taken along the line VIII—VIII of FIG. 7.

Moreover, the grain according to the invention can contain two or more internal rows of explosive sticks. FIGS. 7 and 8 show an embodiment incorporating five rows of explosive sticks in the grain. A grain of such type is advantageously used in a rocket motor which is relatively large in diameter, as it effectively shortens the time which is otherwise required for attaining a steady burning state.

The propellant grain of the invention which has such advantageous features as above described defies practically all of the methods for grain manufacture heretofore in use. It must be fabricated in a special way, which will be described hereunder.

The manufacturing method according to the invention comprises providing a small hole in the axial direction in each propellant mass at least corresponding in number with a row of high-burning-rate explosive sticks to be interposed, inserting each explosive stick into each said hole, bonding all the propellant masses together into a cylindrical grain integral with the explosive sticks held at the predetermined intervals, placing this cylindrical grain upright in the center of a cylindrical vessel-like restrictor, filling the space between said cylindrical grain and said restrictor with liquid-propellant suspension and thereafter allowing said liquid-propellant suspension to solidify to provide an integral bond.

Figure 9:
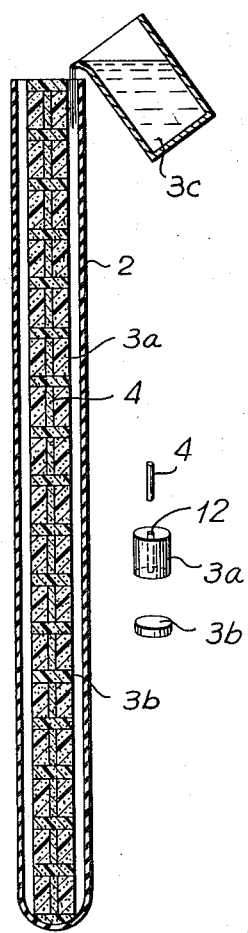
FIG. 9 is a view illustrative of the process of producing a propellant grain according to the invention.

FIG. 9 illustrates the method of making a propellant grain as shown in FIG. 1. Initially, cylindrical propellant masses 3a are machined or cast precisely so as to have a center hole 12, and high-burning-rate explosive sticks 4 of dimensions exactly the same as the center hole are inserted tightly into respective holes. The propellant masses are bonded together, with round discs 3b of the propellant, interposed so that the explosive sticks in each adjoining pair are kept at a predetermined distance from each other, until an integral cylinder of propellant grain containing a multiplicity of the explosive sticks is formed. This cylinder of propellant grain is placed upright into the center of a cylindrical vessel-like restrictor 2 which is open at one end, and then the propellant in liquid form is poured into the space between said cylindrical propellant and said restrictor and is allowed to solidify. A propellant grain according to the invention is then obtained as an integral unit together with the restrictor.

In the process of manufacture under the invention, it is desirable to insert the explosive sticks tightly into the center holes of the propellant, because any space left around an explosive stick may bring a corresponding drop in the propellant packing rate. If, however, it involves great technical difficulties to fit the explosive sticks tightly into the center holes of the propellant, a small space will be permissible, though, in which case, it will be necessary to secure the explosive sticks against loosening in the hollows (indicated by numeral 9 in FIG. 2) while burning, for which purpose a small amount of adhesive is applied to a side of the explosive sticks thereby to bond the sticks partly to the inner surface of the center holes (indicated by numeral 12 in FIG. 9).

What is claimed is:

1. A method of producing a propellant grain comprising forming an axial hole in a succession of propellant masses, inserting an explosive stick of relatively high-burning-rate into each said hole, bonding all the propellant masses together to form a cylindrical grain in which the sticks are arranged axially in at least one row in spaced relation with one another, placing the cylindrical grain upright in the center of a cylindrical vessel-like restrictor, filling the space between said cylindrical grain and said restrictor with liquid-propellant suspension which solidifies to provide an integral bond.

2. A method as claimed in claim 1, wherein small discs of propellant are interposed between adjacent propellant masses in order to space the explosive sticks from one another.

3. A method as claimed in claim 1 comprising tightly fitting the sticks into each hole.

4. A method as claimed in claim 1 comprising securing the sticks in each hole with an adhesive.

5. A method as claimed in claim 1 comprising regularly varying the length of the holes in the propellant masses and the length of the associated sticks so that the sticks regularly increase in length longitudinally along the propellant grain.

6. A method as claimed in claim 2 comprising regularly varying the thickness of the discs so that the spacing between adjacent sticks increases longitudinally along the propellant grain.

7. A method as claimed in claim 1 wherein a plurality of axial holes are provided in each mass and arranged regularly therein so that a plurality of axial lines of explosive sticks are formed in the propellant grain.

8. A method as claimed in claim 1 comprising arranging grain within the restrictor to form an elongated opening at the end where burning is to start.

9. A method as claimed in claim 7 wherein said propellant masses are constituted of propellant having a burning rate of about 10–20 mm./sec. and said explosive sticks have a burning rate exceeding 1000 mm./sec. and more than 50 times as great as that of the surrounding propellant.

10. A method as claimed in claim 1 wherein said explosive sticks are constituted of a mixture of charcoal, sulfur and saltpeter and the propellant is a mixture of an organic chemical fuel and an inorganic oxidant.

References Cited by the Examiner

UNITED STATES PATENTS

| | | | |
|---|---|---|---|
| 1,074,809 | 10/1913 | Newton | 102—98 |
| 3,073,242 | 1/1963 | Hewson | 264—3 |
| 3,185,017 | 5/1963 | Cook et al. | 86—1 |

CARL D. QUARFORTH, *Primary Examiner.*

L. D. RUTLEDGE, *Assistant Examiner.*